(12) United States Patent
Chen et al.

(10) Patent No.: US 11,558,467 B2
(45) Date of Patent: Jan. 17, 2023

(54) VIRTUAL PERSONAL AGENT LEVERAGING NATURAL LANGUAGE PROCESSING AND MACHINE LEARNING

(71) Applicant: International Business Machines Corporation, Armonk, NY (US)

(72) Inventors: Hsiao-Yung Chen, New Taipei (TW); Tzu-Ching Kuo, Taipei (TW); June-Ray Lin, Taipei (TW); Yi-Chun Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 15/834,134

(22) Filed: Dec. 7, 2017

(65) Prior Publication Data
US 2019/0182335 A1  Jun. 13, 2019

(51) Int. Cl.
| H04L 67/141 | (2022.01) |
| G10L 15/22 | (2006.01) |
| G10L 15/18 | (2013.01) |
| G10L 15/30 | (2013.01) |

(52) U.S. Cl.
CPC .......... *H04L 67/141* (2013.01); *G10L 15/22* (2013.01); *G10L 15/1815* (2013.01); *G10L 15/30* (2013.01); *G10L 2015/223* (2013.01)

(58) Field of Classification Search
CPC .................................................. H04L 67/141
See application file for complete search history.

(56) References Cited

U.S. PATENT DOCUMENTS

| 8,326,643 | B1* | 12/2012 | Eshkenazi | G06Q 30/02 |
| | | | | 379/265.06 |
| 8,351,581 | B2* | 1/2013 | Mikan | H04M 3/42221 |
| | | | | 379/88.14 |
| 9,276,802 | B2 | 3/2016 | Lynch et al. | |
| 9,697,828 | B1* | 7/2017 | Prasad | G10L 15/18 |
| 2003/0210770 | A1* | 11/2003 | Krejcarek | H04B 3/54 |
| | | | | 379/88.17 |
| 2003/0217061 | A1* | 11/2003 | Agassi | G06F 16/954 |
| 2010/0131264 | A1* | 5/2010 | Ljolje | G10L 13/027 |
| | | | | 704/9 |
| 2012/0311038 | A1* | 12/2012 | Trinh | G06F 21/33 |
| | | | | 709/204 |
| 2013/0275164 | A1* | 10/2013 | Gruber | G10L 17/22 |
| | | | | 705/5 |
| 2014/0143666 | A1* | 5/2014 | Kennedy | H04L 67/42 |
| | | | | 715/705 |

(Continued)

*Primary Examiner* — Tonia L Dollinger
*Assistant Examiner* — Ishrat Rashid
(74) *Attorney, Agent, or Firm* — Yee & Associates, P.C.

(57) ABSTRACT

Providing inter-virtual agent communication between communication devices owned by different users is provided. A first communication channel and a second communication channel are established with a remote data processing system. A virtual agent-to-virtual agent handshake is performed during establishment of the first communication channel. Virtual agent commands are exchanged with a remote virtual agent located on the remote data processing system via the first communication channel. An action corresponding to a virtual agent command received from the remote virtual agent located on the remote data processing system is performed while a human conversation is conducted via the second communication channel.

14 Claims, 11 Drawing Sheets

(56) References Cited

U.S. PATENT DOCUMENTS

| | | | |
|---|---|---|---|
| 2014/0164305 A1 | 6/2014 | Lynch et al. | |
| 2014/0164508 A1* | 6/2014 | Lynch | H04L 29/08081 |
| | | | 709/204 |
| 2014/0164532 A1 | 6/2014 | Lynch et al. | |
| 2015/0088514 A1 | 3/2015 | Typrin | |
| 2015/0186156 A1* | 7/2015 | Brown | G06F 3/04817 |
| | | | 715/706 |
| 2015/0373183 A1* | 12/2015 | Woolsey | H04M 1/72448 |
| | | | 455/418 |
| 2016/0072940 A1 | 3/2016 | Cronin | |
| 2017/0132019 A1 | 5/2017 | Karashchuk et al. | |

* cited by examiner

VIRTUAL PERSONAL AGENT LEVERAGING NATURAL LANGUAGE PROCESSING AND MACHINE LEARNING

BACKGROUND

1. Field

The disclosure relates generally to virtual personal agents and more specifically to providing communication and interaction between virtual personal agents of different data processing systems owned by different users via a separate virtual agent-to-virtual agent communication channel while the users of the different data processing systems communicate via a human-to-human voice communication channel.

2. Description of the Related Art

A virtual personal assistant is a software application or program on a data processing system, such as a smart phone, that performs tasks or services for a user. A user may prompt a virtual personal assistant by using, for example, text or voice inputs. Virtual personal assistants use natural language processing to match a text or voice input to executable commands. Virtual personal assistants may be built into an operating system (OS) of the smart phone or may be built independent of the OS. Virtual personal assistants can provide a wide variety of services based on user input, location awareness, and an ability to access information from a variety of online sources, such as, for example, weather and traffic conditions, news reports, stock prices, retail prices, and the like. Virtual personal assistants can perform a variety of tasks, such as, for example, set an alarm, make a to-do list, make a shopping list; play music, play movie or TV show, and the like.

SUMMARY

According to one illustrative embodiment, a method for providing inter-virtual agent communication between communication devices owned by different users is provided. A first communication channel and a second communication channel are established with a remote data processing system. A virtual agent-to-virtual agent handshake is performed during establishment of the first communication channel. Virtual agent commands are exchanged with a remote virtual agent located on the remote data processing system via the first communication channel. An action corresponding to a virtual agent command received from the remote virtual agent located on the remote data processing system is performed while a human conversation is conducted via the second communication channel. According to other illustrative embodiments, a data processing system and computer program product for providing inter-virtual agent communication between communication devices owned by different users are provided.

DETAILED DESCRIPTION

Figure 1:
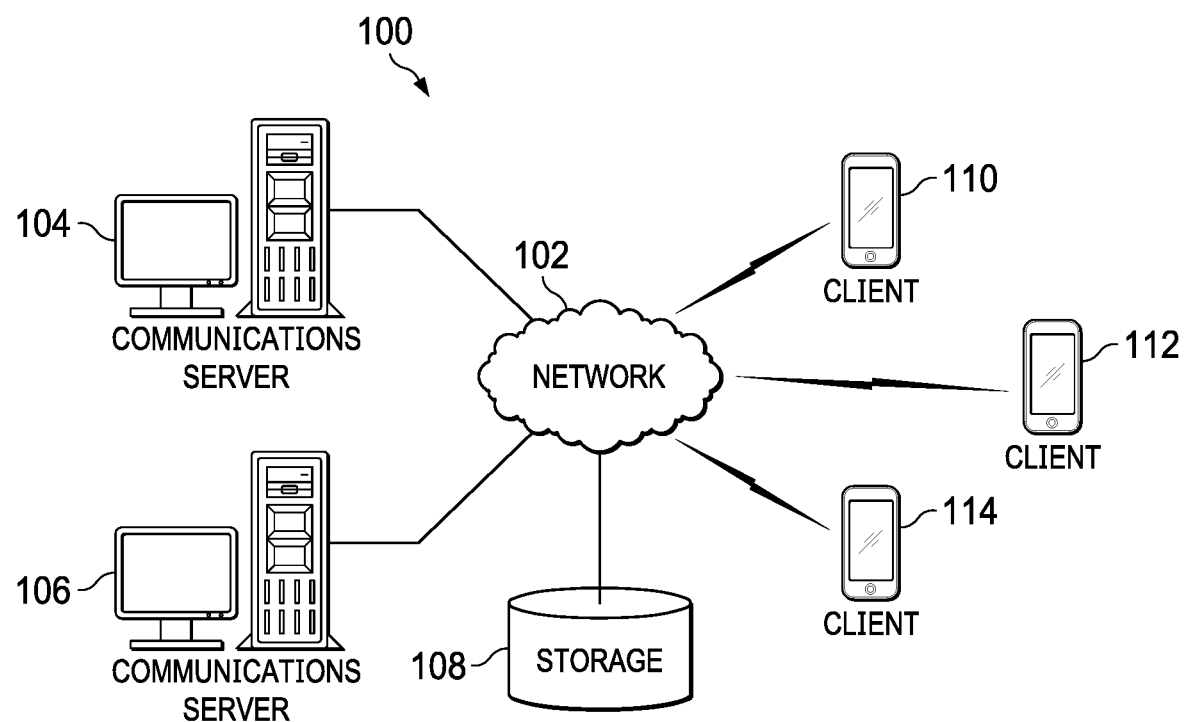
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, communications server 104 and communications server 106 connect to network 102, along with storage 108. Communications server 104 and communications server 106 may be, for example, server computers with high-speed connections to network 102. In addition, communications server 104 and communications server 106 may provide a set of communications services, such as voice and text communications, to client devices. Also, it should be noted that communications server 104 and communications server 106 may represent a plurality of different servers hosting a plurality of different communications services.

Client 110, client 112, and client 114 also connect to network 102. Clients 110, 112, and 114 are clients of communications server 104 and/or communications server 106. In this example, clients 110, 112, and 114 are illustrated as mobile telephones, such as, for example, smart phones, with wireless communication links to network 102. However, it should be noted that clients 110, 112, and 114 are meant as examples only. In other words, clients 110, 112, and 114 may include other types of data processing systems, such as, for example, desktop or personal computers, laptop computers, handheld computers, smart watches, smart televisions, gaming devices, kiosks, and the like, with wire or wireless communication links to network 102. Also, it should be noted that clients 110, 112, and 114 are owned by different users. The users of clients 110, 112, and 114 may utilize clients 110, 112, and 114 to access the communications services provided by communications server 104 and/or communications server 106 to communicate with each other and with other client device users.

Storage 108 is a network storage device capable of storing any type of data in a structured format or an unstructured format. In addition, storage 108 may represent a plurality of network storage devices. Further, storage 108 may store identifiers for a plurality of client devices; identifiers for a plurality of virtual agents corresponding to the plurality of client devices; a plurality of different virtual agents; and the like. Furthermore, storage unit 108 may store other types of data, such as authentication or credential data that may include user names, passwords, and biometric data associated with users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on communications server 104 and downloaded to client 110 over network 102 for use on client 110.

In the depicted example, network data processing system 100 may be implemented as a number of different types of communication networks, such as, for example, telecommunications network, an internet, an intranet, a local area network (LAN), and a wide area network (WAN). FIG. 1 is intended as an example only, and not as an architectural limitation for the different illustrative embodiments.

Figure 2:
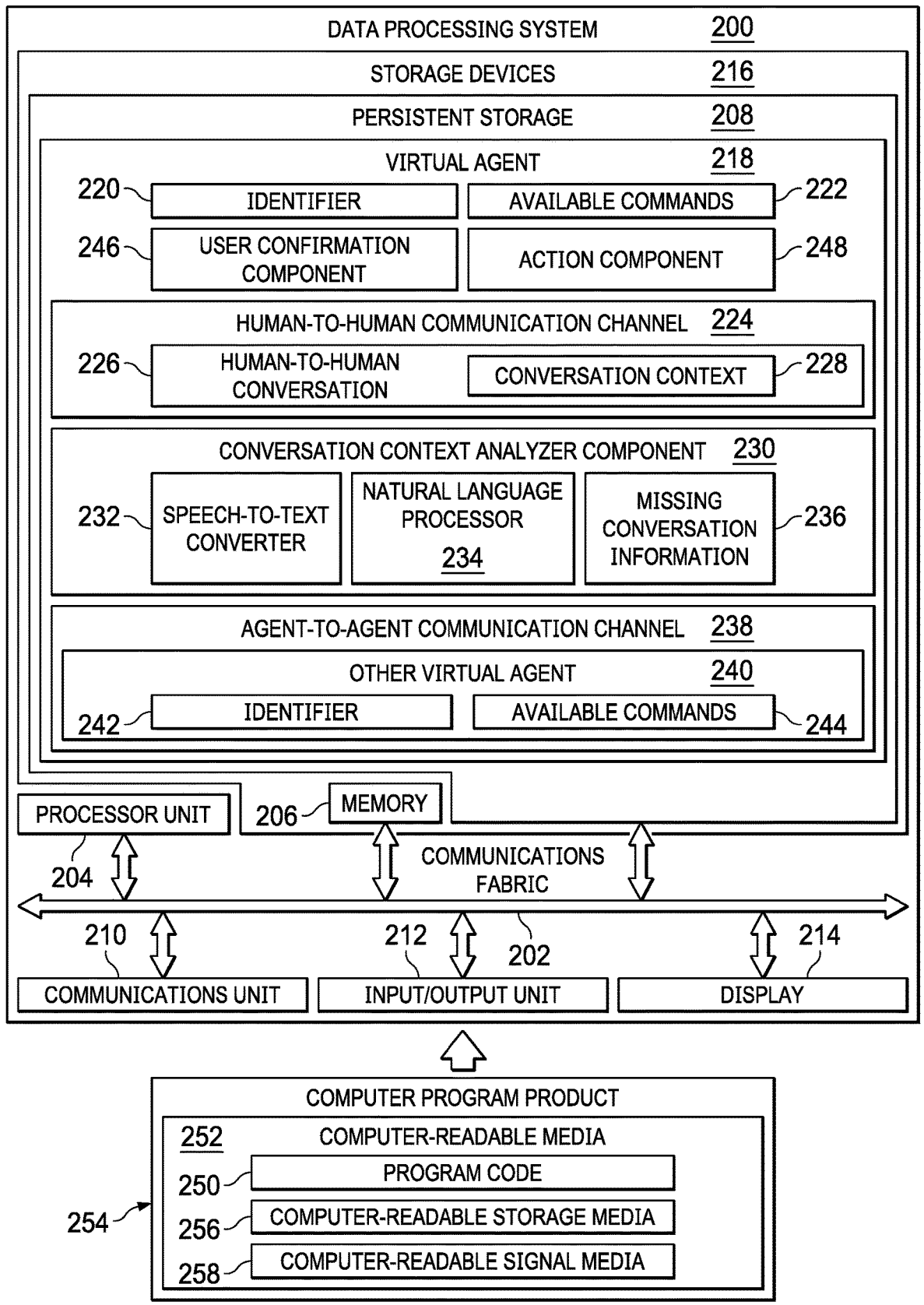
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a communications device, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores virtual agent 218. However, it should be noted that even though virtual agent 218 is illustrated as residing in persistent storage 208, in an alternative illustrative embodiment virtual agent 218 may be a separate component of data processing system 200. For example, virtual agent 218 may be a hardware component coupled to communication fabric 202 or a combination of hardware and software components.

Virtual agent 218 may be, for example, a voice personal assistant that performs tasks or services for a user of data processing system 200 based on user voice input. In addition, virtual agent 218 may perform tasks or services based on voice and/or text command input received from a virtual agent on another data processing system connected to data processing system 200. Virtual agent 218 includes identifier 220 and available commands 222. Identifier 220 represents a unique identifier corresponding to virtual agent 218 for uniquely identifying virtual agent 218. Available commands 222 represent a list of voice and/or text commands that virtual agent 218 is capable of understanding to perform tasks and services.

Human-to-human communication channel 224 represents a network connection for transmitting human-to-human conversation 226 between data processing system 200 and another data processing system. Virtual agent 218 analyzes human-to-human conversation 226 to determine conversation context 228. Conversation context 228 represents characteristics of the content related to human-to-human conversation 226.

Virtual agent 218 analyzes human-to-human conversation 226 using conversation context analyzer component 230. Conversation context analyzer component 230 utilizes speech-to-text converter 232 and natural language processor 234 to determine conversation context 228 and missing conversation information 236. Missing conversation information 236 represents information that appears to be missing, such as a specified time for a scheduled meeting, from human-to-human conversation 226.

Agent-to-agent communication channel 238 represents a separate, dedicated network connection for transmitting virtual agent-to-virtual agent voice and/or text command communications between virtual agent 218 of data processing system 200 and other virtual agent 240 of another data processing system. Other virtual agent 240 may be a same type of virtual agent as virtual agent 218 or may be a different type of virtual agent. Similar to virtual agent 218, other virtual agent 240 includes identifier 242 and available commands 244. Identifier 242 uniquely identifies other virtual agent 240. Available commands 244 represent a list of voice and/or text commands that other virtual agent 240 is capable of understanding to perform tasks and services. Virtual agent 218 shares available commands 222 with other virtual agent 240 and other virtual agent 240 shares available commands 244 with virtual agent 218 to enable communication between virtual agent 218 and other virtual agent 240.

Virtual agent 218 also includes user confirmation component 246 and action component 248. User confirmation component 246 requests confirmation or authorization from a user of data processing system 200 prior to virtual agent 218 performing an action, such as sharing information with other virtual agent 240. User confirmation component 246 may, for example, generate a pop up box in display 214 requesting the user of data processing system 200 to allow or deny an action by inputting or selecting a desired response in the pop up box. If the user allows the action, then action component 248 performs the action, such as booking an appointment in an electronic calendar corresponding to the user of data processing system 200.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

When making schedules with people during phone conversations, the individuals always have to check both of their calendars while talking. Similarly, when someone on the other side of a phone conversation is asking for another person's phone number, the individual has to search for the phone number and then tell the other person the phone number or text the phone number later after the conversation is finished. However, many smart phones currently include a voice personal assistant. Yet, these voice personal assistants are not helping smart phone users when the users are talking on their smart phones.

Illustrative embodiments utilize virtual agents, such as, for example, voice personal assistants, to work in the background to assist smart phone users while the users are talking on their smart phones. The virtual agents listen to and analyze the conversation between smart phone users to determine conversation context or characteristics of the conversation content using natural language processing and machine learning, for example. Based on the determined conversation context, the virtual agents are able to provide missing conversation information or perform tasks, such as, for example, arranging social engagements, exchanging social or business contacts, booking meetings/appointments, making to-do lists, and the like.

For example, a virtual agent may suggest sending a telephone number to another person engaged in the phone conversation and request confirmation or permission from the user to perform the action. In addition, the virtual agent may enter into a negotiation with a virtual agent on another smart phone to set up a meeting between smart phone users. Further, the virtual agent may proactively hint to its user that the other person engaged in the conversation has a birthday today or has a scheduled meeting in five minutes based on data received from the other persons virtual agent.

Illustrative embodiments establish a second virtual agent-to-agent communication channel in addition to a first human-to-human communication channel, enabling virtual agents to smartly detect missing information in the human-to-human conversation and facilitating information exchange between virtual agents to complete the missing information required for real actions. The virtual agents set up the second agent-to-agent communication channel by sending corresponding unique identifiers or phone numbers to a centralized communications server to confirm an authorized channel, analyze the human conversation over the first human-to-human communication channel using speech-to-text and natural language processing to understand the context of the conversation and find missing conversation information, and exchange information with other virtual agent to complete the missing conversation information required for action in a given conversation context for real action. It should be noted that the two virtual agents must handshake during setup of the virtual agent-to-virtual agent communication channel and provide available "virtual agent commands" to each other, which allows for heterogeneous virtual agents of different voice communication devices to work together.

Figure 3:
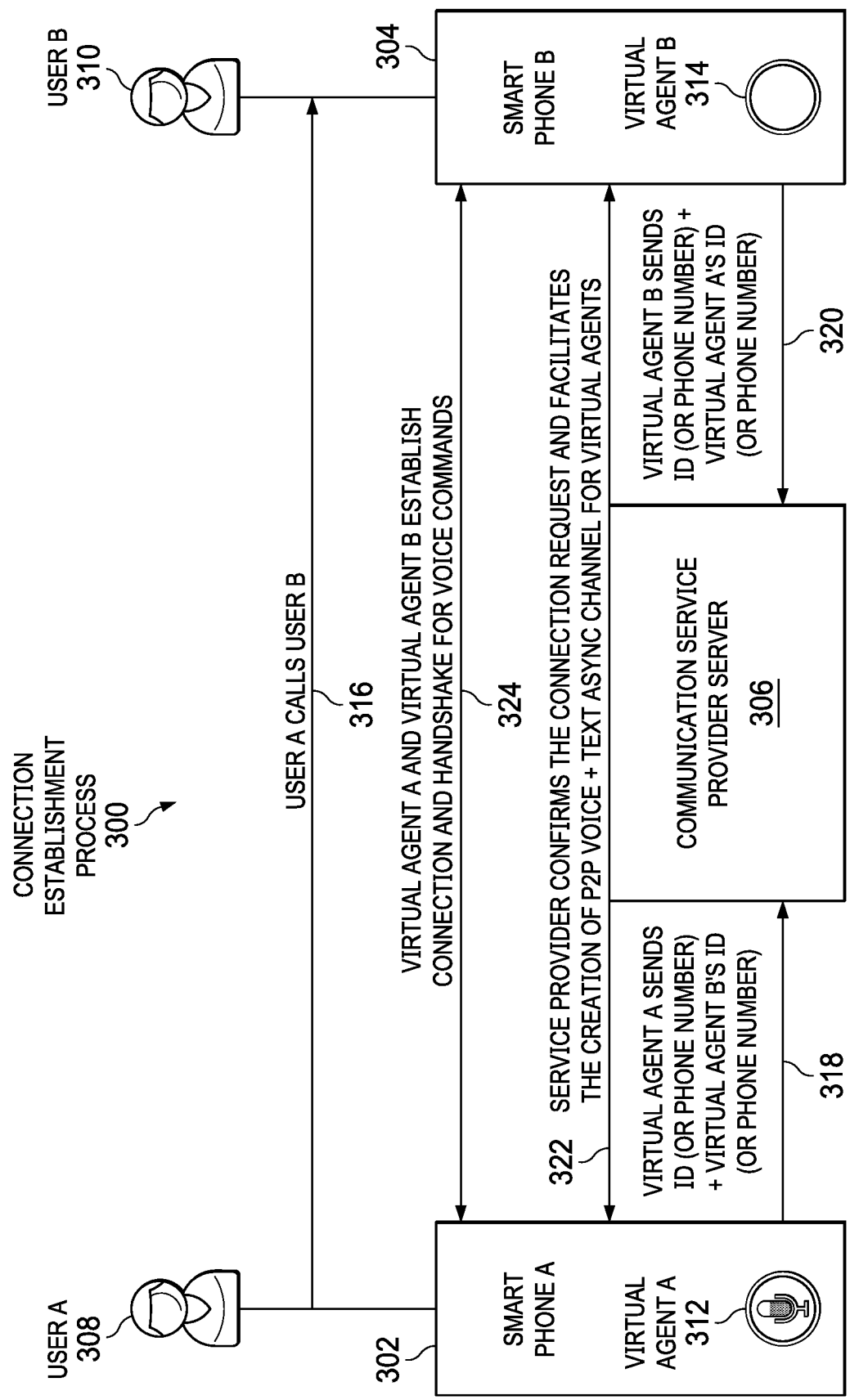
FIG. 3 is a diagram illustrating an example of a connection establishment process in accordance with an illustrative embodiment.

With reference now to FIG. 3, a diagram illustrating an example of a connection establishment process is depicted in accordance with an illustrative embodiment. Connection establishment process 300 may be implemented in a network of data processing systems, such as network data processing system 100 in FIG. 1. Connection establishment process 300 establishes a communication connection between data processing systems via a service provider.

In this example, connection establishment process 300 establishes a communication connection between smart phone A 302 and smart phone B 304 via communication service provider server 306. Smart phone A 302, smart phone B 304, and communication service provider server 306 may be, for example, client 110, client 112, and communications server 104 in FIG. 1. Also in this example, smart phone A 302 corresponds to user A 308 and smart phone B 304 corresponds to user B 310. It should be noted that user A 308 and user B 310 are different users (i.e., not the same user) and that user A 308 owns smart phone A 302 and user B 310 owns smart phone B 304.

Further, smart phone A 302 includes virtual agent A 312 and smart phone B 304 includes virtual agent B 314. Virtual agent A 312 and virtual agent B 314 may be, for example, virtual agent 218 in FIG. 2. Also, virtual agent A 312 and virtual agent B 314 may be, for example, voice personal assistants. However, it should be noted that in this example virtual agent A 312 and virtual agent B 314 represent different types of virtual agents (i.e., not the same software application or program).

Further in this example, user A 308 utilizes smart phone A 302 to call user B 310 on smart phone B 304 at 316. While user A 308 calls user B 310 at 316, virtual agent A 312 sends its unique identifier or telephone number of smart phone A 302 and the unique identifier corresponding to virtual agent B 314 or the telephone number of smart phone B 304 to communication service provider server 306 at 318. Concurrently, virtual agent B 314 sends its unique identifier or telephone number of smart phone B 304 and the unique identifier corresponding to virtual agent A 312 or the telephone number of smart phone A 302 to communication service provider server 306 at 320.

After receiving the identifying information from both virtual agent A 312 and virtual agent B 314, communication service provider server 306 confirms the connection request and facilitates creation of a separate peer-to-peer (P2P) voice and text asynchronous communication channel between virtual agent A 312 and virtual agent B 314 at 322. Afterward, virtual agent A 312 and virtual agent B 314 establish a virtual agent-to-virtual agent communication channel and handshake exchanging available virtual agent commands, such as, for example, available commands 222 and 244 in FIG. 2, at 324. The available virtual agent commands may be, for example, voice-based commands and/or text-based commands.

Figure 4:
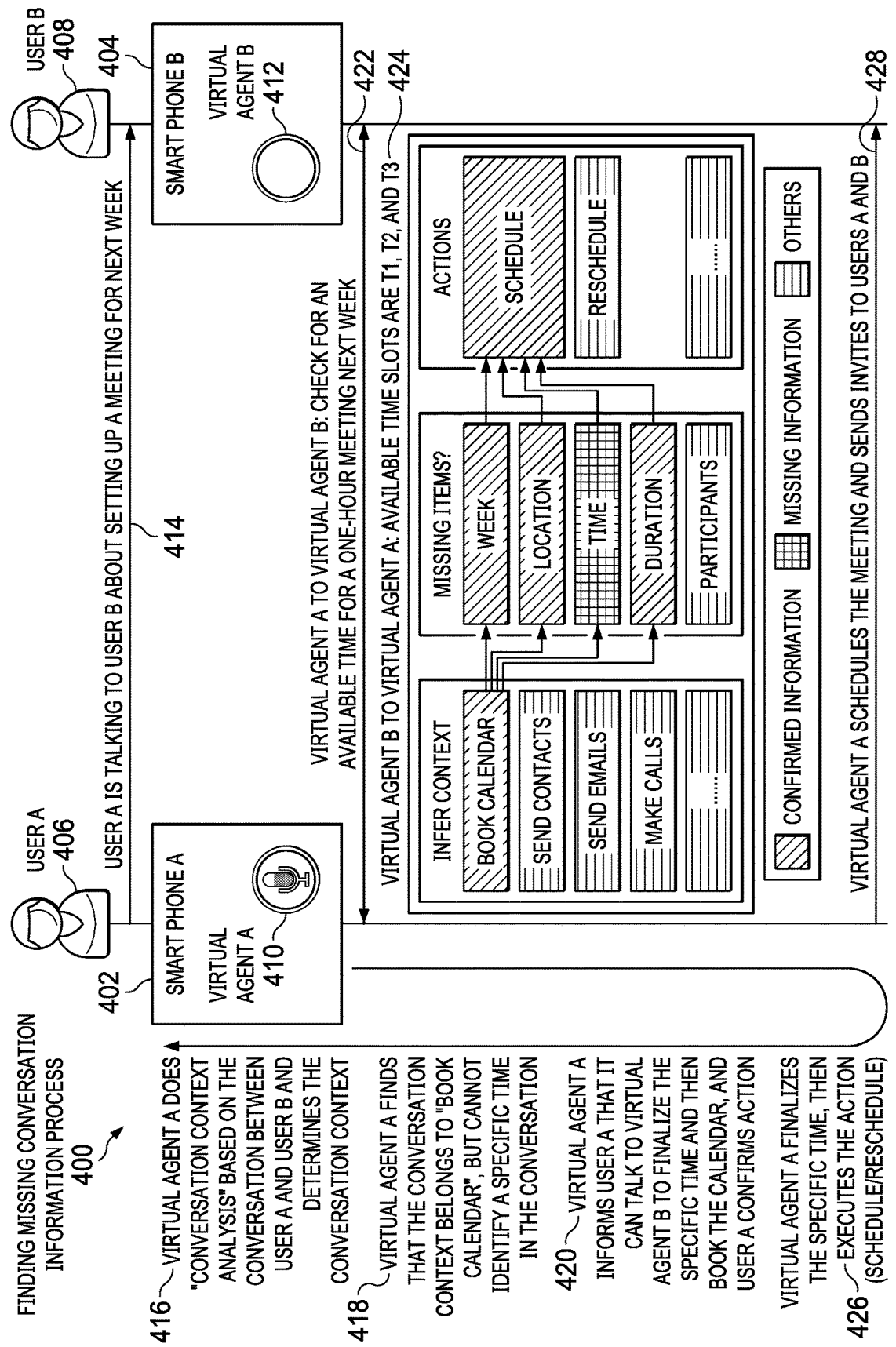
FIG. 4 is a diagram illustrating an example of a finding missing conversation information process in accordance with an illustrative embodiment.

With reference now to FIG. 4, a diagram illustrating an example of a finding missing conversation information process is depicted in accordance with an illustrative embodiment. Finding missing conversation information process 400 may be implemented in a network of data processing systems, such as network data processing system 100 in FIG. 1. Finding missing conversation information process 400 finds information that appears to be missing from a voice conversation between users of connected data processing systems via a network, such as network 102 in FIG. 1.

In this example, finding missing conversation information process 400 includes a voice communication connection between smart phone A 402 and smart phone B 404. Also in this example, smart phone A 402 corresponds to user A 406 and smart phone B 404 corresponds to user B 408. Further, smart phone A 402 includes virtual agent A 410 and smart phone B 404 includes virtual agent B 412.

User A 406 utilizes smart phone A 402 to call user B 408 on smart phone B 404 to talk about setting up a meeting for next week at 414. While user A 406 calls user B 408 at 414, virtual agent A 410 performs a conversation context analysis based on the conversation between user A 406 and user B 408 and determines the conversation context or content characteristics of the conversation at 416. Virtual agent A 410 finds that the conversation context belongs to book calendar, but cannot identify a specific time in the conversation at 418.

Virtual agent A 410 informs user A 406 that it can talk to virtual agent B 412 to finalize the specific time for the meeting next week and then book the calendar, and user A 406 confirms the action of virtual agent A 410 to talk with virtual agent B 412 at 420. After user A 406 confirms the action at 420, virtual agent A 410 asks virtual agent B 412 to check for an available time for a one-hour meeting next week at 422. In response at 424, virtual agent B 412 informs virtual agent A 410 that available time slots are T1, T2, and T3.

Virtual agent A 410 then finalizes the specific time for the one-hour meeting next week between user A 406 and user B 408 and executes a corresponding action of booking the meeting in the electronic calendar at 426. Virtual agent A 410 then schedules the meeting with virtual agent B 412 and sends invites to the meeting to user A 406 and user B 408 at 428.

Figure 5:
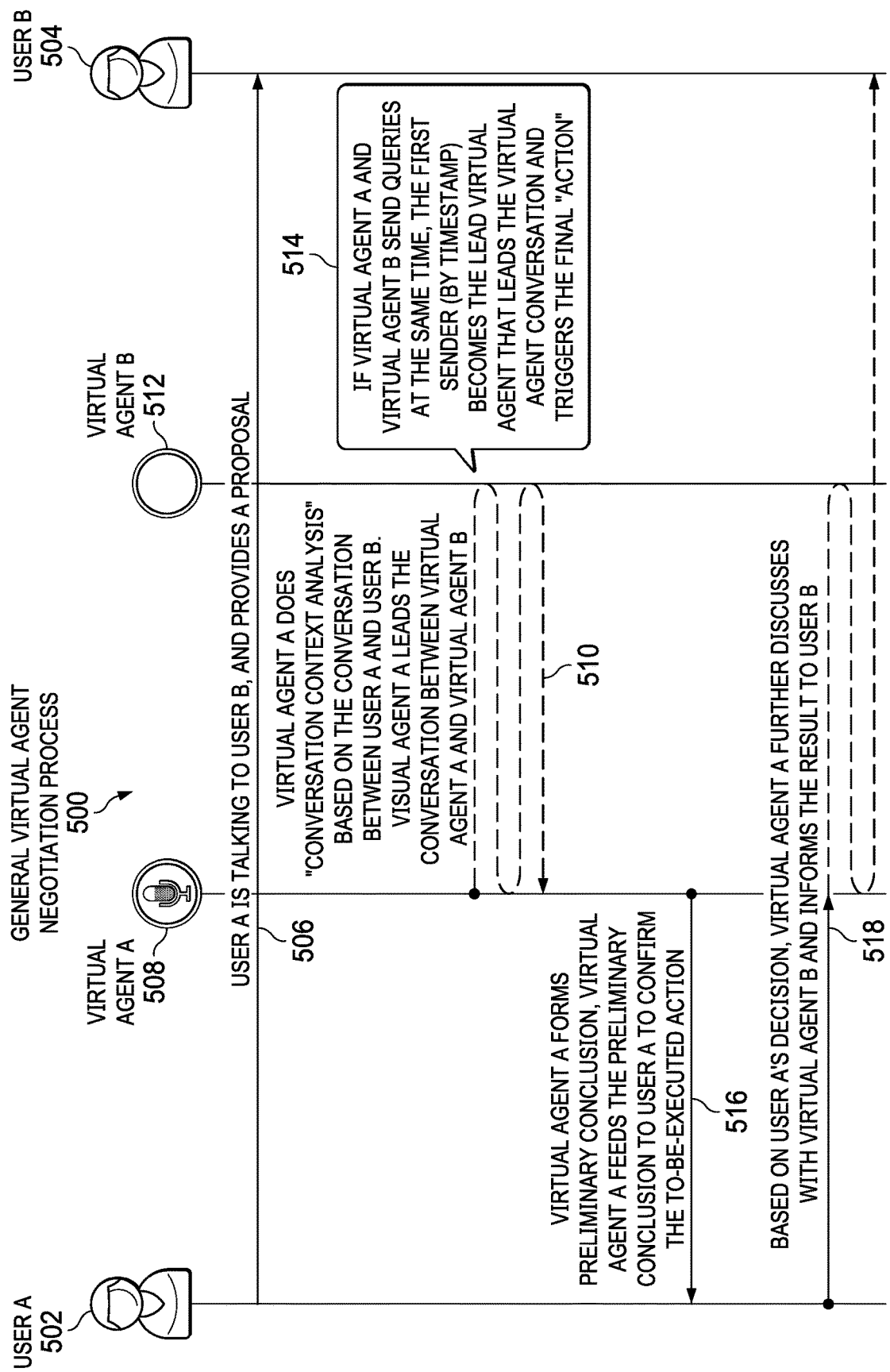
FIG. 5 is a diagram illustrating an example of a general virtual agent negotiation process in accordance with an illustrative embodiment.

With reference now to FIG. 5, a diagram illustrating an example of a general virtual agent negotiation process is depicted in accordance with an illustrative embodiment. General virtual agent negotiation process 500 may be implemented in a network of data processing systems, such as network data processing system 100 in FIG. 1. General virtual agent negotiation process 500 performs a negotiation between virtual agents.

In this example, general virtual agent negotiation process 500 includes a voice communication connection between user A 502 and user B 504. User A 502 is talking to user B 504, and provides a proposal at 506. Further, virtual agent A 508, which corresponds to user A 502, performs a conversation context analysis based on the conversation between user A 502 and user B 504 at 510. It should be noted that virtual agent A 508 leads the conversation between virtual agent A 508 and virtual agent B 512. For example, if virtual agent A 508 and virtual agent B 512 send queries at the same time, the first sender (e.g., by timestamp) becomes the lead virtual agent that leads the virtual agent conversation and triggers the final action (514). Also, it should be noted that virtual agent B 512 corresponds to user B 504.

At 516, virtual agent A 508 forms a preliminary conclusion and feeds the preliminary conclusion to user A 502 to confirm the to-be-executed action. Based on user A 502's decision to confirm the to-be-executed action, virtual agent A 508 further discusses with virtual agent B 512 the preliminary conclusion and informs user B 504 of the result of the virtual agent discussion.

Figure 6:
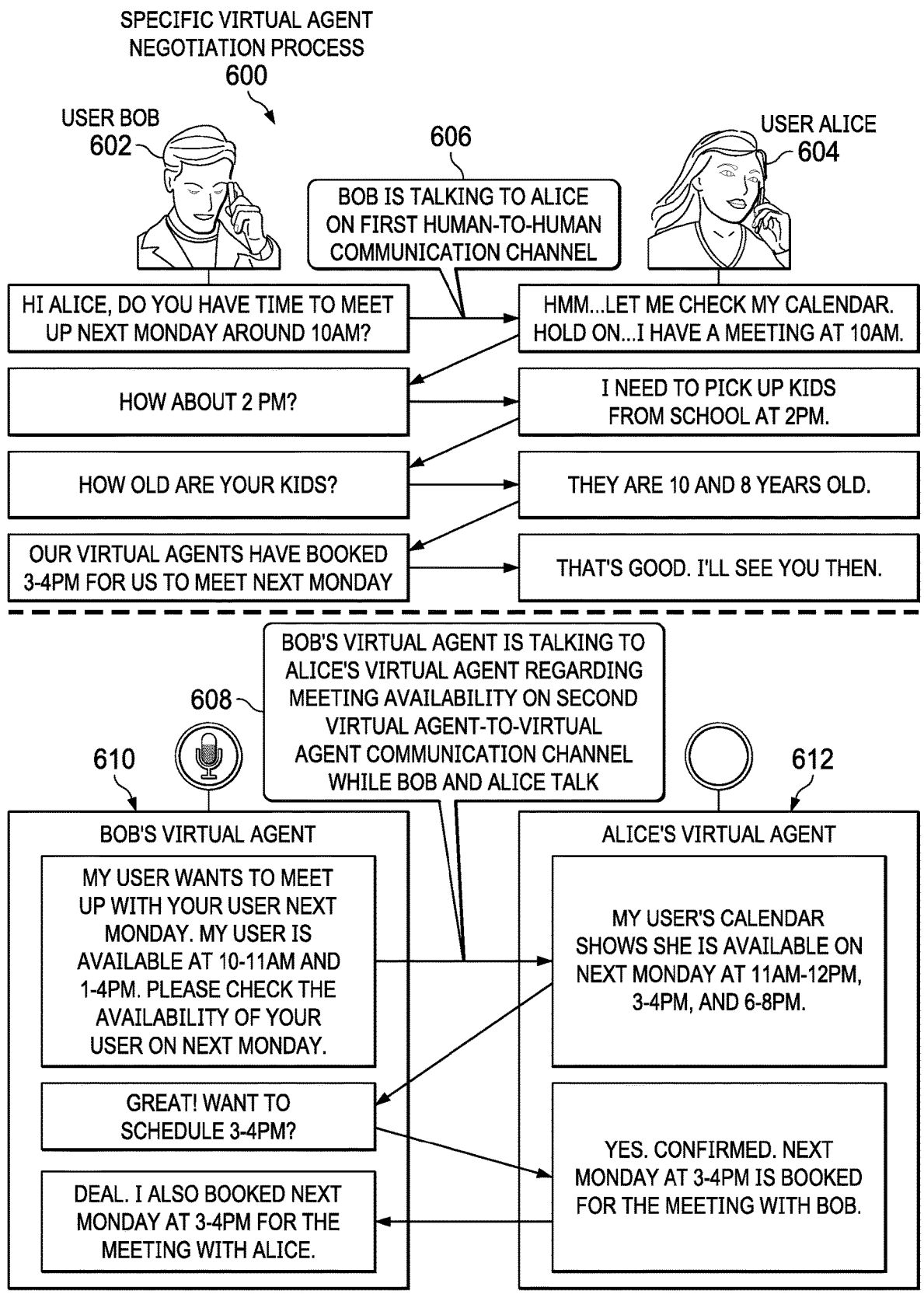
FIG. 6 is a diagram illustrating an example of a specific virtual agent negotiation process in accordance with an illustrative embodiment.

With reference now to FIG. 6, a diagram illustrating an example of a specific virtual agent negotiation process is depicted in accordance with an illustrative embodiment. Specific virtual agent negotiation process 600 may be implemented in a network of data processing systems, such as network data processing system 100 in FIG. 1. Specific virtual agent negotiation process 600 performs a meeting time negotiation between virtual agents.

In this example, specific virtual agent negotiation process 600 includes a voice communication connection between user Bob 602 and user Alice 604. At 606, user Bob 602 is talking to user Alice 604 via a first human-to-human communication channel about meeting next Monday. At 608, while User Bob 602 is talking to user Alice 604, Bob's virtual agent 610 is talking to Alice's virtual agent 612 regarding meeting availability via a second separate virtual agent-to-virtual agent communication channel.

Bob's virtual agent 610 informs Alice's virtual agent 612 that my user (i.e., Bob) wants to meet up with your user (i.e., Alice) next Monday. My user (i.e., Bob) is available at 10-11 a.m. and 1-4 p.m. Please check the availability of your user (i.e., Alice) next Monday. In response, Alice's virtual agent 612 informs Bob's virtual agent 610 that my user's (i.e., Alice's) calendar shows she is available next Monday at 11 a.m.-12 p.m., 3-4 p.m., and 6-8 p.m. In response, Bob's virtual agent 610 asks if Alice's virtual agent 612 wants to schedule the meeting from 3-4 p.m. next Monday. In response, Alice's virtual agent 612 confirms to Bob's virtual agent 610 that next Monday from 3-4 p.m. is booked for the meeting with Bob. In response, Bob's virtual agent 610 confirms to Alice's virtual agent 612 that next Monday from 3-4 p.m. is booked for the meeting with Alice.

Figure 7:
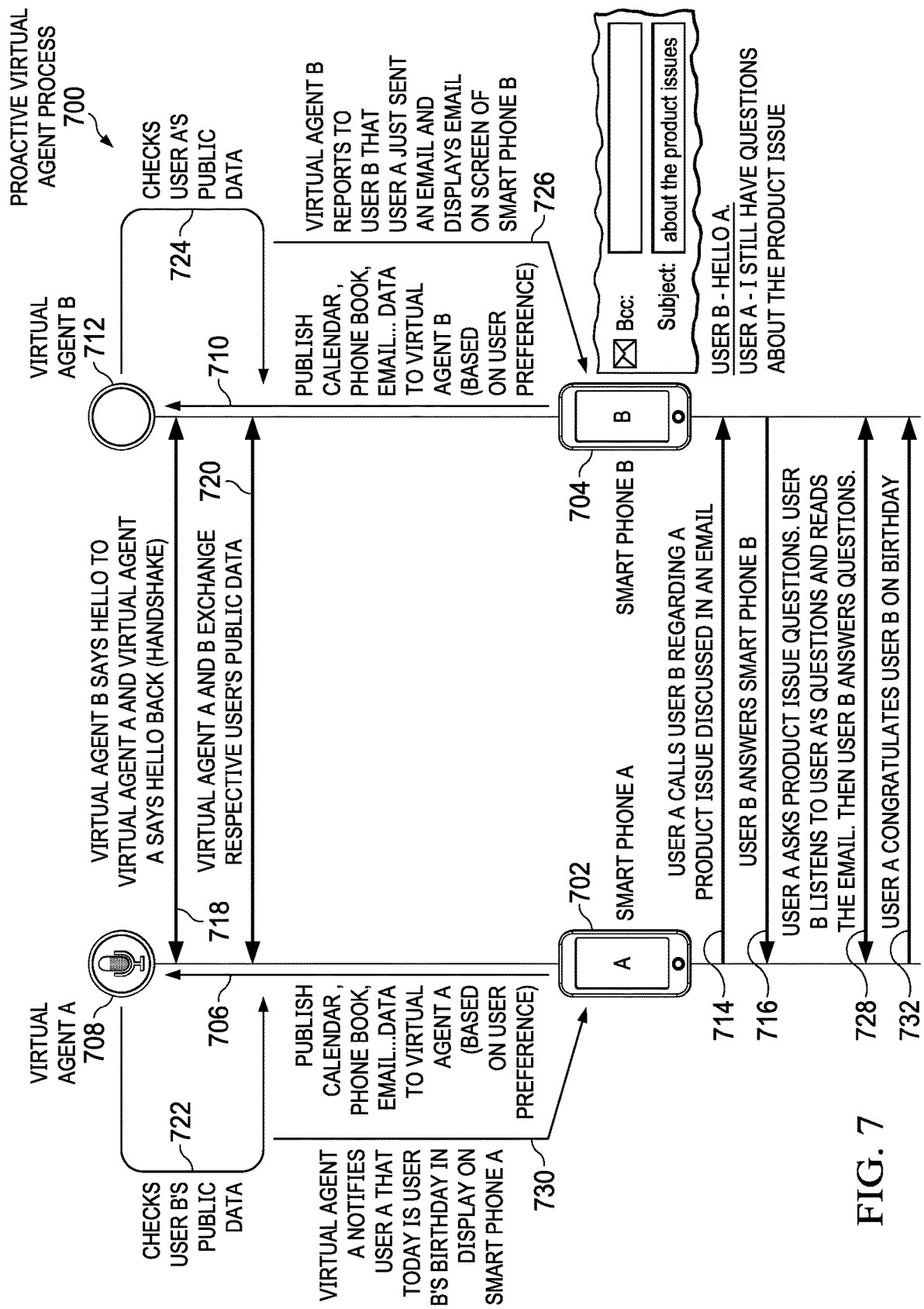
FIG. 7 is a diagram illustrating an example of a proactive virtual agent process in accordance with an illustrative embodiment.

With reference now to FIG. 7, a diagram illustrating an example of a proactive virtual agent process is depicted in accordance with an illustrative embodiment. Proactive virtual agent process 700 may be implemented in a network of data processing systems, such as network data processing system 100 in FIG. 1. Proactive virtual agent process 700 allows a virtual agent to proactively discover information and then to inform its user of the discovered information.

In this example, proactive virtual agent process 700 includes smart phone A 702 and smart phone B 704. At 706, smart phone A 702 publishes public data, such as, for example, calendar, phone book, email, and the like, to virtual agent A 708 based on preference of the user of smart phone A 702. Similarly, at 710, smart phone B 704 publishes public data, such as, for example, calendar, phone book, email, and the like, to virtual agent B 712 based on preference of the user of smart phone B 704.

At 714, the user of smart phone A 702 calls the user of smart phone B 704 regarding a product issue discussed in a sent email. At 716, the user of smart phone B 704 answers the call from the user of smart phone A 702. At 718, while the users of smart phones A 702 and B 704 are conversing via a first human-to-human communication channel, virtual agent B 712 says hello to virtual agent A 708 and virtual agent A 708 says hello back (i.e., handshake) via a separate second virtual agent-to-virtual agent communication channel.

At 720, virtual agent A 708 and virtual agent B 712 exchange public data of their respective users. At 722, virtual agent A 708 checks user B's public data received from virtual agent B 712. Similarly, at 724, virtual agent B 712 checks user A's public data received from virtual agent A 708.

Further, at 726, virtual agent B 712 informs the user of smart phone B 704 that the user of smart phone A 702 just sent an email "about the product issues" and displays the email on the screen of smart phone B 704. At 728, the user of smart phone A 702 asks product issue questions. The user of smart phone B 704 listens to the questions of the user of smart phone A 702 and reads the email displayed on the screen of smart phone B 704 by virtual agent B 712. Subsequently, the user of smart phone B 704 answers the questions.

It should be noted that while virtual agent A 708 was checking user B's public data received from virtual agent B 712 at 722, virtual agent A 708 discovered that today was the birthdate of the user of smart phone B 704. As a result, virtual agent A 708 proactively notifies the user of smart phone A 702 in a display of smart phone A 702 that today is user B's birthday. Consequently, at 732, user A is able to congratulate user B on birthday.

Figure 8:
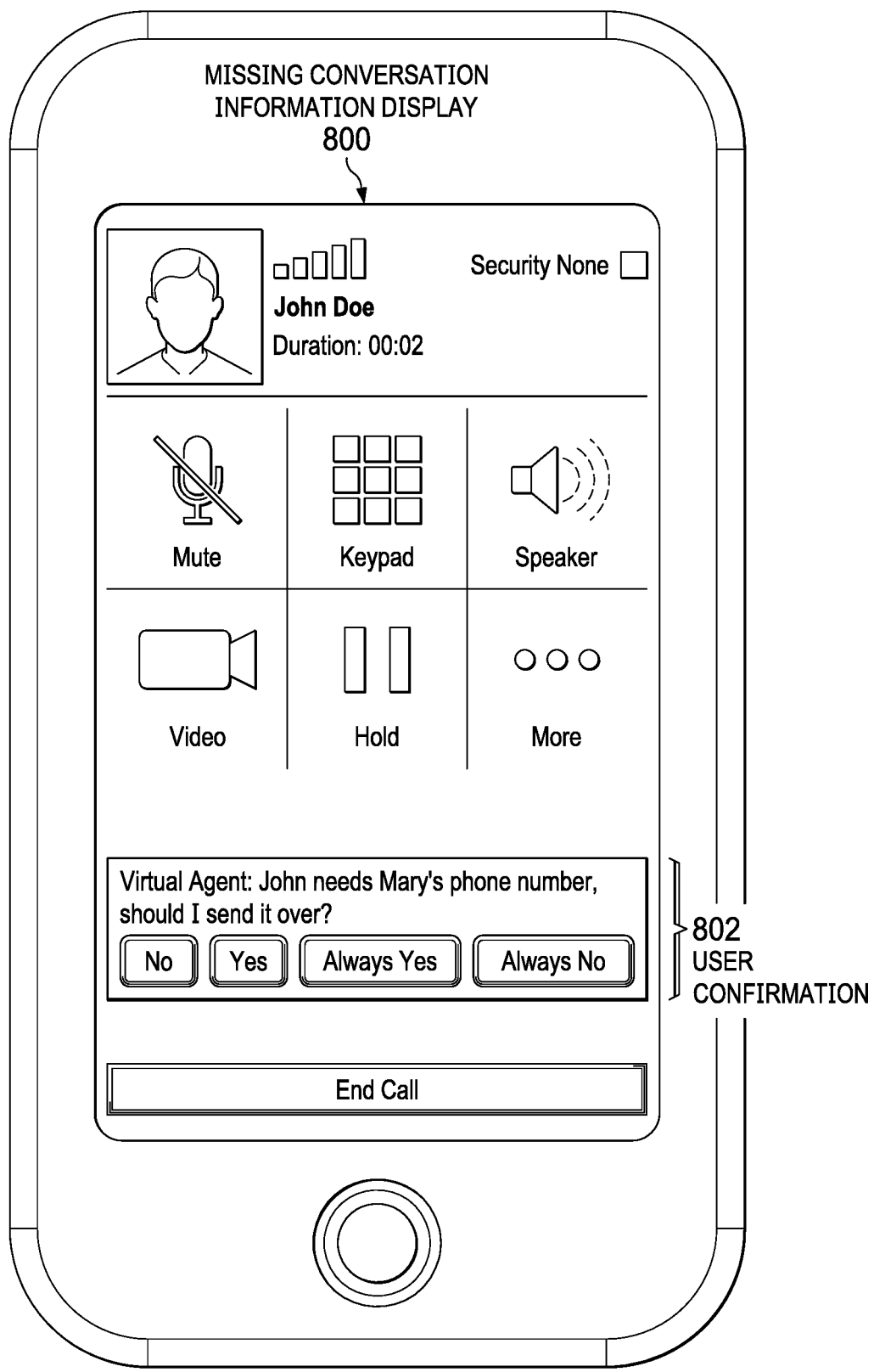
FIG. 8 is an example of a missing conversation information display in accordance with an illustrative embodiment.

With reference now to FIG. 8, an example of a missing conversation information display is depicted in accordance with an illustrative embodiment. Missing conversation information display 800 may be implemented in a smart phone, such as, for example, smart phone A 402 in FIG. 4. In this example, missing conversation information display 800 includes user confirmation 802.

User confirmation 802 is a pop up box generated by a virtual agent of the smart phone, such as, for example, virtual agent A 410 in FIG. 4. In this example, the virtual agent is asking the user of the smart phone, such as user A 406 in FIG. 4, the question "John needs Mary's phone number, should I send it over?" User confirmation 802 includes the user selections of "No", "Yes", "Always Yes", and "Always No". The user selection in user confirmation 802 determines whether the virtual agent will send John's telephone number to Mary or not. In addition, the virtual agent may utilize machine learning to remember the user selection for future reference when a same or similar user conversation occurs. Thus, the virtual agent may automatically know whether or not to send the requested information (e.g., "Always Yes" or "Always No") without confirmation.

Figure 9:
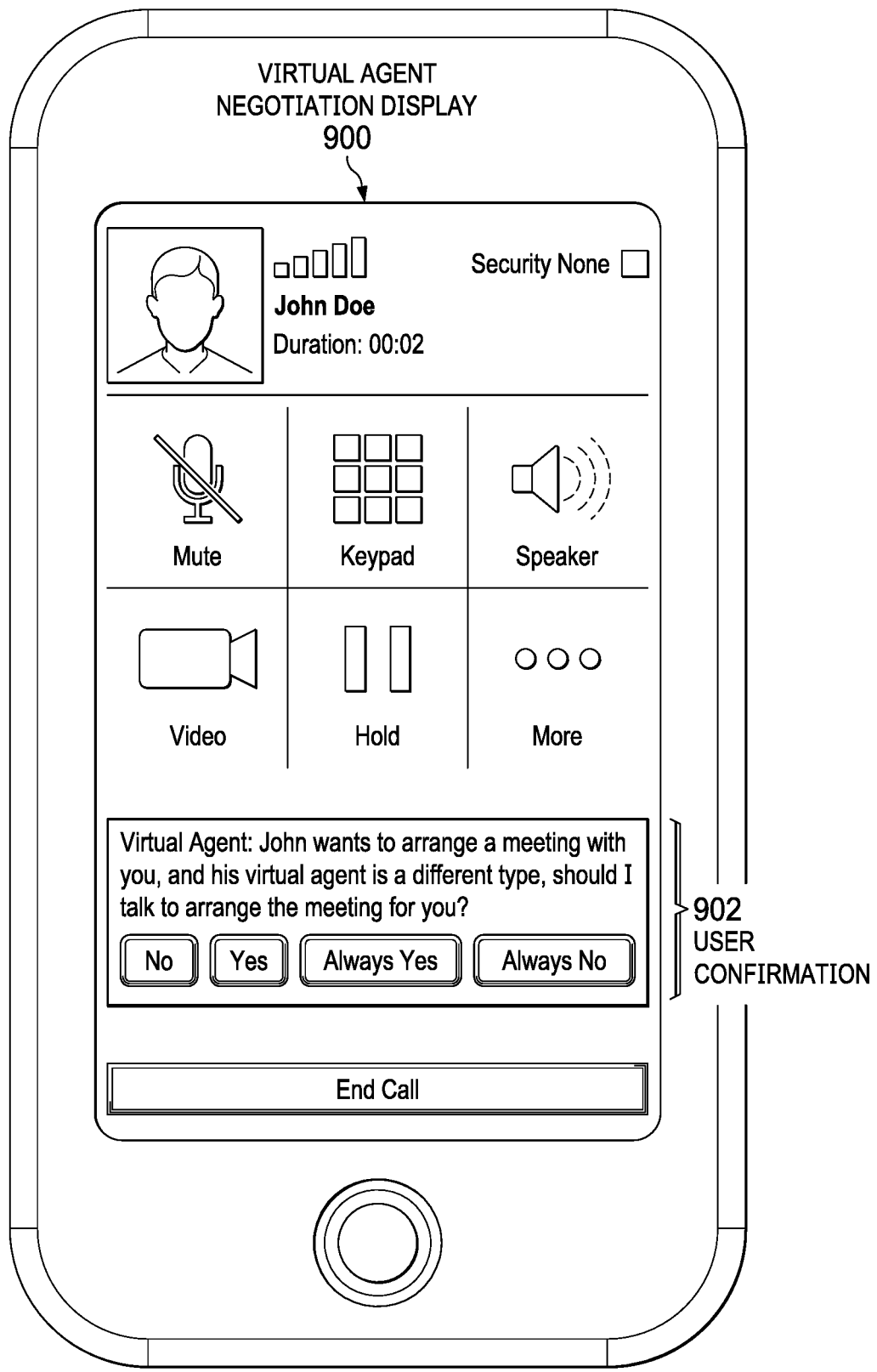
FIG. 9 is an example of a virtual agent negotiation display in accordance with an illustrative embodiment.

With reference now to FIG. 9, an example of a virtual agent negotiation display is depicted in accordance with an illustrative embodiment. Virtual agent negotiation display 900 may be implemented in a smart phone, such as, for example, smart phone A 402 in FIG. 4. In this example, virtual agent negotiation display 900 includes user confirmation 902.

User confirmation 902 is a pop up box generated by a virtual agent of the smart phone, such as, for example, virtual agent A 410 in FIG. 4. In this example, the virtual agent is asking the user of the smart phone, such as user A 406 in FIG. 4, the question "John wants to arrange a meeting with you, and his virtual agent is a different type, should I arrange the meeting for you?" User confirmation 902 includes the user selections of "No", "Yes", "Always Yes", and "Always No". The user selection in user confirmation 902 determines whether or not the virtual agent will negotiate with John's virtual agent to determine and schedule a mutually available meeting time.

Figure 10:
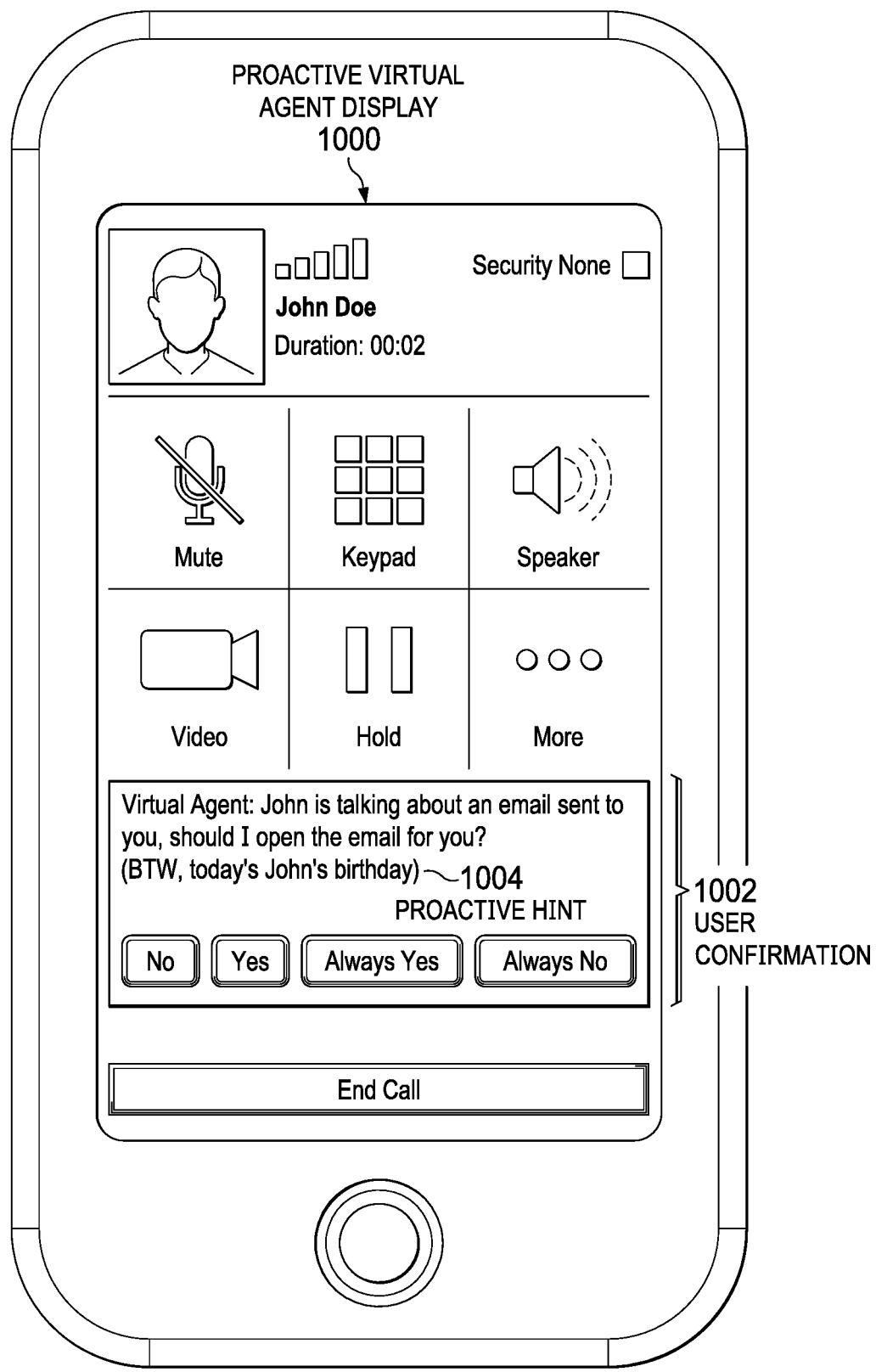
FIG. 10 is an example of a proactive virtual agent display in accordance with an illustrative embodiment.

With reference now to FIG. 10, an example of a proactive virtual agent display is depicted in accordance with an illustrative embodiment. Proactive virtual agent display 1000 may be implemented in a smart phone, such as, for example, smart phone A 702 in FIG. 7. In this example, proactive virtual agent display 1000 includes user confirmation 1002.

User confirmation 1002 is a pop up box generated by a virtual agent of the smart phone, such as, for example, virtual agent A 708 in FIG. 7. In this example, the virtual agent is asking the user of the smart phone the question "John is talking about an email sent to you, should I open the email for you?" User confirmation 1002 includes the user selections of "No", "Yes", "Always Yes", and "Always No". The user selection in user confirmation 1002 determines whether or not the virtual agent will open and display John's email for the smart phone user.

Further, it should be noted that user confirmation 1002 includes proactive hint 1004. In this example, proactive hint 1004 is "BTW, today's John's birthday". As a result, the smart phone user is now able to wish John a happy birthday during the phone conversation.

Figure 11:
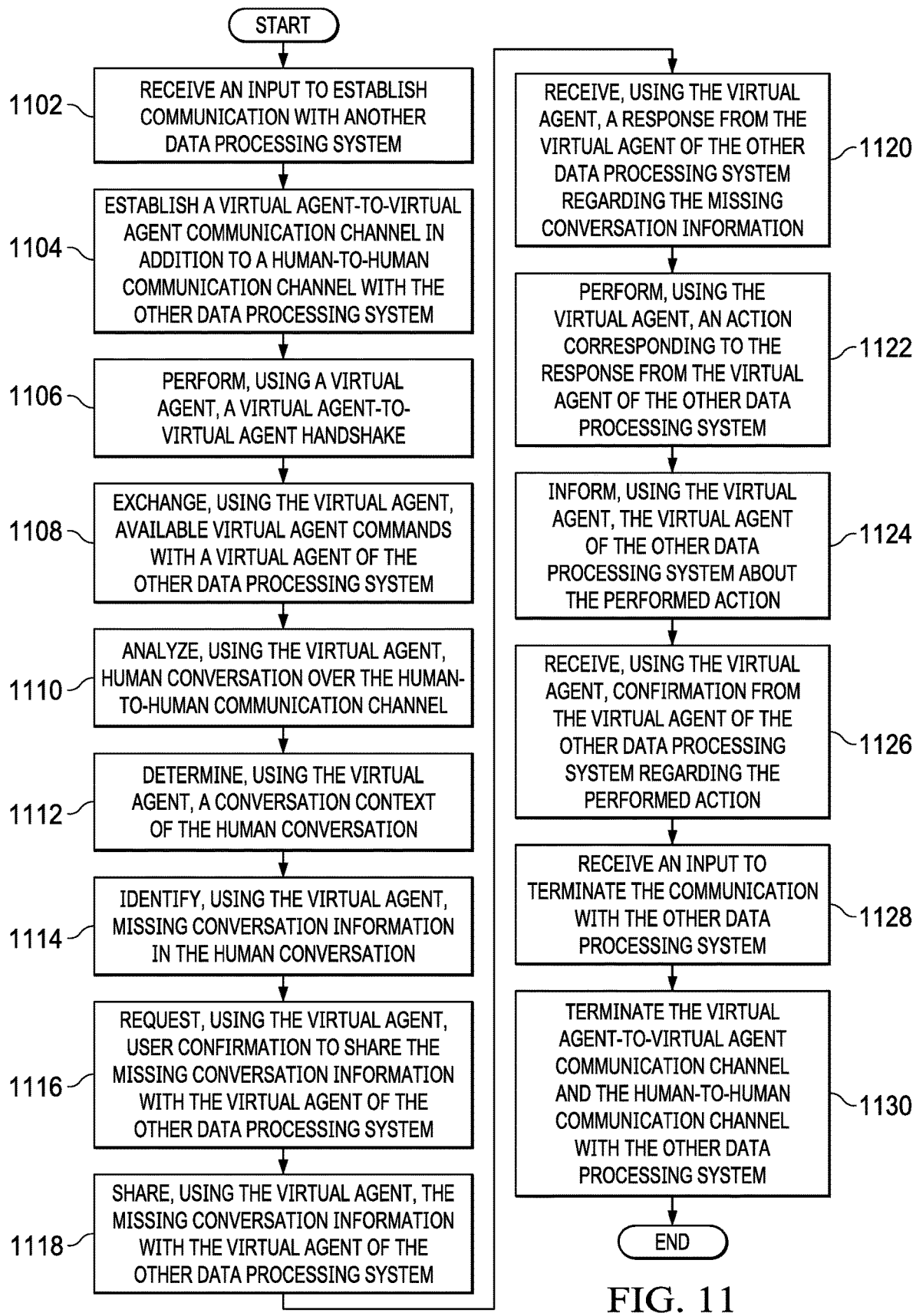
FIG. 11 is a flowchart illustrating a process for providing communication between virtual agents in accordance with an illustrative embodiment.

With reference now to FIG. 11, a flowchart illustrating a process for providing communication between virtual agents is shown in accordance with an illustrative embodiment. The process shown in FIG. 11 may be implemented in a data processing device, such as, for example, client 110 in FIG. 1 or data processing system 200 in FIG. 2.

The process begins when the data processing system receives an input to establish communication with another data processing system via a network (step 1102). In response to the input, the data processing system establishes a virtual agent-to-virtual agent communication channel in addition to a human-to-human communication channel with the other data processing system (step 1104). It should be noted that virtual agents of the two data processing systems only communicate via the separate virtual agent-to-virtual agent communication channel during the network connection between the data processing systems. Similarly, users of the two data processing systems only converse via the human-to-human communication channel during the network connection between the data processing systems.

Further, the data processing system, using a virtual agent, performs a virtual agent-to-virtual agent handshake during establishment of the virtual agent-to-virtual agent communication channel (step 1106). In addition, the data processing system, using the virtual agent, exchanges available virtual agent commands with a virtual agent of the other data processing system while the virtual agent performs the virtual agent-to-virtual agent handshake via the virtual agent-to-virtual agent communication channel (step 1108). The available virtual agent commands may be, for example, voice commands and/or text commands.

The data processing system, using the virtual agent, analyzes human conversation over the human-to-human communication channel by the virtual agent using speech-to-text and natural language processing (step 1110). Furthermore, the data processing system, using the virtual agent, determines a conversation context (e.g., content characteristics) of the human conversation based on the virtual agent analyzing the human conversation (step 1112). The data processing system, using the virtual agent, also identifies missing conversation information in the human conversation based on the virtual agent determining the conversation context (step 1114).

Afterward, the data processing system, using the virtual agent, requests user confirmation to share the missing conversation information with the virtual agent of the other data processing system (step 1116). The data processing system, using the virtual agent, shares the missing conversation information with the virtual agent of the other data processing system via the virtual agent-to-virtual agent communication channel based on receiving the user confirmation (step 1118). Subsequently, the data processing system, using the virtual agent, receives a response via the virtual agent-to-virtual agent communication channel from the virtual agent of the other data processing system regarding the missing conversation information (step 1120).

The data processing system, using the virtual agent, performs an action corresponding to the response from the virtual agent of the other data processing system (step 1122). In addition, the data processing system, using the virtual agent, informs the virtual agent of the other data processing system about the performed action via the virtual agent-to-virtual agent communication channel (step 1124). Subsequently, the data processing system, using the virtual agent, receives confirmation via the virtual agent-to-virtual agent communication channel from the virtual agent of the other data processing system regarding the performed action (step 1126).

The data processing system receives an input to terminate the communication with the other data processing system (step 1128). In response to the input to terminate the connection, the data processing system terminates the virtual agent-to-virtual agent communication channel and the human-to-human communication channel with the other data processing system (step 1130). It should be noted that the data processing system may instruct the virtual agent to terminate the virtual agent-to-virtual agent communication channel with the virtual agent of the other data processing system within a defined period of time (e.g., 1-3 seconds) from the input to terminate the connection for security to prevent data leaks or snooping. Thereafter, the process terminates.

Thus, illustrative embodiments of the present invention provide a computer-implemented method, computer system, and computer program product for providing communication and interaction between virtual personal agents of different data processing systems via a separate virtual agent-to-virtual agent communication channel while users of the different data processing system communicate via a human-to-human voice communication channel. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing inter-virtual agent communication between communication devices owned by different users, the method comprising:
    establishing a first communication channel and a second communication channel with a remote data processing system;
    performing a virtual agent-to-virtual agent handshake during establishment of the first communication channel;
    exchanging virtual agent commands with a remote virtual agent located on the remote data processing system via the first communication channel;
    performing an action corresponding to a virtual agent command received from the remote virtual agent located on the remote data processing system while a human conversation is conducted via the second communication channel;
    analyzing the human conversation conducted via the second communication channel using a local virtual agent;
    determining a conversation context of the human conversation based on the local virtual agent analyzing the human conversation;
    identifying missing conversation information in the human conversation based on the local virtual agent determining the conversation context;
    requesting user confirmation to share the missing conversation information with the remote virtual agent located on the remote data processing system; and
    sharing the missing conversation information with the remote virtual agent located on the remote data processing system via the first communication channel based on receiving the user confirmation to share the missing conversation information.

2. The method of claim 1 further comprising:
    informing the remote virtual agent located on the remote data processing system about the performed action via the first communication channel; and
    receiving confirmation via the first communication channel from the remote virtual agent located on the remote data processing system regarding the performed action.

3. The method of claim 1, wherein the first communication channel is a virtual agent-to-virtual agent communication channel where only virtual agents of different data processing systems communicate and interact during a network connection between the different data processing systems, and further comprising:
    sending an identifier of a local virtual agent to a communication service provider server.

4. The method of claim 1, wherein the first communication channel is a peer-to-peer voice and text asynchronous channel dedicated to virtual agents, wherein the first communication channel is established in part by sending an identifier of a local virtual agent to a communication service provider server.

5. The method of claim 1, wherein the second communication channel is a human-to-human communication channel where the human conversation is conducted during a network connection between different data processing systems.

6. The method of claim 1, wherein the virtual agent commands are at least one of voice-based commands and text-based commands that a respective virtual agent understands to perform tasks and services, and further comprising:
    sending available virtual agent commands that a local virtual agent is capable of understanding to the remote virtual agent.

7. The method of claim 1, wherein the remote virtual agent via the first communication channel shares data corresponding to a user of the remote virtual agent with a local virtual agent located on a local data processing system based on a preference of the user.

8. The method of claim 7, wherein the local virtual agent proactively notifies a user of the local virtual agent on a display device regarding a particular portion of the data shared by the remote virtual agent while the human conversation is conducted via the second communication channel.

9. A data processing system for providing inter-virtual agent communication between communication devices owned by different users, the data processing system comprising:
    a bus system;
    a storage device connected to the bus system, wherein the storage device stores program instructions; and
    a processor connected to the bus system, wherein the processor executes the program instructions to:
        establish a first communication channel and a second communication channel with a remote data processing system;
        perform a virtual agent-to-virtual agent handshake during establishment of the first communication channel;
        exchange virtual agent commands with a remote virtual agent located on the remote data processing system via the first communication channel;
        perform an action corresponding to a virtual agent command received from the remote virtual agent located on the remote data processing system while a human conversation is conducted via the second communication channel;
        analyze the human conversation conducted via the second communication channel using a local virtual agent;
        determine a conversation context of the human conversation based on the local virtual agent analyzing the human conversation;
        identify missing conversation information in the human conversation based on the local virtual agent determining the conversation context;
        request user confirmation to share the missing conversation information with the remote virtual agent located on the remote data processing system; and
        share the missing conversation information with the remote virtual agent located on the remote data processing system via the first communication channel based on receiving the user confirmation to share the missing conversation information.

10. A computer program product for providing inter-virtual agent communication between communication devices owned by different users, the computer program product comprising a computer readable storage medium having program instructions embodied therewith, the program instructions executable by a data processing system to cause the data processing system to perform a method comprising:

establishing a first communication channel and a second communication channel with a remote data processing system;

performing a virtual agent-to-virtual agent handshake during establishment of the first communication channel;

exchanging virtual agent commands with a remote virtual agent located on the remote data processing system via the first communication channel;

performing an action corresponding to a virtual agent command received from the remote virtual agent located on the remote data processing system while a human conversation is conducted via the second communication channel;

analyzing the human conversation conducted via the second communication channel using a local virtual agent;

determining a conversation context of the human conversation based on the local virtual agent analyzing the human conversation;

identifying missing conversation information in the human conversation based on the local virtual agent determining the conversation context;

requesting user confirmation to share the missing conversation information with the remote virtual agent located on the remote data processing system; and sharing the missing conversation information with the remote virtual agent located on the remote data processing system via the first communication channel based on receiving the user confirmation to share the missing conversation information.

11. The computer program product of claim 10 wherein the program instructions further cause the data processing system to perform:

informing the remote virtual agent located on the remote data processing system about the performed action via the first communication channel; and receiving confirmation via the first communication channel from the remote virtual agent located on the remote data processing system regarding the performed action.

12. The computer program product of claim 10, wherein the first communication channel is a virtual agent-to-virtual agent communication channel where only virtual agents of different data processing systems communicate and interact during a network connection between the different data processing systems, and wherein the program instructions further cause the data processing system to perform:

sending an identifier of a local virtual agent to a communication service provider server.

13. The computer program product of claim 10, wherein the first communication channel is a peer-to-peer voice and text asynchronous channel dedicated to virtual agents, wherein the first communication channel is established in part by sending an identifier of a local virtual agent to a communication service provider server.

14. The computer program product of claim 10, wherein the second communication channel is a human-to-human communication channel where the human conversation is conducted during a network connection between different data processing systems.

* * * * *